United States Patent
Hansen (10) Patent No.: US 11,532,441 B2
(45) Date of Patent: Dec. 20, 2022

(54) ELECTRODE ASSEMBLY FOR AN ULTRACAPACITOR

(71) Applicant: AVX Corporation, Fountain Inn, SC (US)

(72) Inventor: Shawn Hansen, Simpsonville, SC (US)

(73) Assignee: KYOCERA AVX Components Corporation, Fountain Inn, SC (US)

(*) Notice: Subject to any disclaimer, the term of this patent is extended or adjusted under 35 U.S.C. 154(b) by 0 days.

(21) Appl. No.: 16/627,392

(22) PCT Filed: Jun. 29, 2018

(86) PCT No.: PCT/US2018/040252
§ 371 (c)(1),
(2) Date: Dec. 30, 2019

(87) PCT Pub. No.: WO2019/006276
PCT Pub. Date: Jan. 3, 2019

(65) Prior Publication Data
US 2020/0219667 A1    Jul. 9, 2020

Related U.S. Application Data

(60) Provisional application No. 62/527,278, filed on Jun. 30, 2017.

(51) Int. Cl.
*H01G 11/42* (2013.01)
*H01G 11/28* (2013.01)
(Continued)

(52) U.S. Cl.
CPC ............. *H01G 11/42* (2013.01); *H01G 11/28* (2013.01); *H01G 11/52* (2013.01); *H01G 11/60* (2013.01); *H01G 11/68* (2013.01); *H01G 11/70* (2013.01)

(58) Field of Classification Search
None
See application file for complete search history.

(56) References Cited

U.S. PATENT DOCUMENTS 6,310,756 B1    10/2001  Miura et al.
2002/0110729 A1  8/2002  Hozumi et al.
(Continued)

FOREIGN PATENT DOCUMENTS

JP  H0963630   3/1997
JP  H10177935  6/1998
(Continued)

OTHER PUBLICATIONS

European Search Report for EP18824607.8 dated Mar. 9, 2021, 8 pages.
(Continued)

*Primary Examiner* — Dion R. Ferguson
(74) *Attorney, Agent, or Firm* — Dority & Manning, P.A.

(57) ABSTRACT

An electrode assembly for an ultracapacitor is provided. The electrode assembly contains a first electrode comprising a first current collector electrically coupled to a first carbonaceous coating, a second electrode comprising a second current collector electrically coupled to a second carbonaceous coating, and a separator positioned between the first electrode and the second electrode. At least a portion of the first current collector projects beyond the first longitudinal edge to define a first projecting portion, wherein the offset ratio of the first projecting portion is from about 0.02 to about 0.3.

21 Claims, 3 Drawing Sheets

(51) Int. Cl.
*H01G 11/52* (2013.01)
*H01G 11/60* (2013.01)
*H01G 11/68* (2013.01)
*H01G 11/70* (2013.01)

(56) References Cited

U.S. PATENT DOCUMENTS

| | | |
|---|---|---|
| 2003/0043532 A1 | 3/2003 | Noguchi et al. |
| 2004/0090736 A1* | 5/2004 | Bendale .............. H01G 11/32 361/502 |
| 2005/0142436 A1* | 6/2005 | Arai .................... H01M 4/78 429/94 |
| 2005/0207096 A1* | 9/2005 | Hinoki ................ H01G 11/86 361/502 |
| 2006/0034036 A1 | 2/2006 | Miura et al. |
| 2007/0026140 A1* | 2/2007 | Hinoki ................ H01G 11/74 427/115 |
| 2008/0013254 A1* | 1/2008 | Miller ................. H01G 11/74 361/502 |
| 2008/0026293 A1 | 1/2008 | Marple et al. |
| 2008/0089006 A1* | 4/2008 | Zhong ................ C04B 35/532 361/303 |
| 2008/0089012 A1 | 4/2008 | Kon et al. |
| 2013/0286542 A1 | 10/2013 | Madiberk et al. |
| 2014/0308554 A1 | 10/2014 | Khakhalev |
| 2015/0143680 A1 | 5/2015 | Krug et al. |
| 2017/0338054 A1* | 11/2017 | Knopsnyder ......... H01G 11/68 |
| 2019/0259459 A1* | 8/2019 | Tokutomi ........... G11C 16/3459 |

FOREIGN PATENT DOCUMENTS

| | | |
|---|---|---|
| JP | 2000315632 | 11/2000 |
| JP | 2011176140 | 9/2011 |
| JP | 2012209482 | 10/2012 |

OTHER PUBLICATIONS

International Search Report and Opinion for PCT/US2018/040252 dated Nov. 15, 2018, 12 pages.

* cited by examiner

ELECTRODE ASSEMBLY FOR AN ULTRACAPACITOR

CROSS REFERENCE TO RELATED APPLICATIONS

The present application is a 371 of PCT Application No. PCT/US2018/040252 having a filing date of Jun. 29, 2018, which claims filing benefit of U.S. Provisional Patent Application Ser. No. 62/527,278 having a filing date of Jun. 30, 2017, both of which are incorporated herein by reference in their entirety.

BACKGROUND OF THE INVENTION

Electrical energy storage cells are widely used to provide power to electronic, electromechanical, electrochemical, and other useful devices. An electric double layer ultracapacitor, for instance, generally employs a pair of polarizable electrodes that contain carbon particles (e.g., activated carbon) impregnated with a liquid electrolyte. Due to the effective surface area of the particles and the small spacing between the electrodes, large capacitance values may be achieved. Nevertheless, problems remain. For instance, many conventional ultracapacitors are sensitive to high temperatures, which may lead to increased equivalent series resistance ("ESR"). As such, a need currently exists for an ultracapacitor with improved electrical properties.

SUMMARY OF THE INVENTION

In accordance with one embodiment of the present invention, an electrode assembly for an ultracapacitor is disclosed that defines a length between opposing first and second longitudinal edges. The electrode assembly comprises a first electrode comprising a first current collector electrically coupled to a first carbonaceous coating, a second electrode comprising a second current collector electrically coupled to a second carbonaceous coating, and a separator positioned between the first electrode and the second electrode. At least a portion of the first current collector projects beyond the first longitudinal edge to define a first projecting portion. The offset ratio of the first projecting portion is from about 0.02 to about 0.3.

Other features and aspects of the present invention are set forth in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figure in which.

Repeat use of reference characters in the present specification and drawing is intended to represent same or analogous features or elements of the invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention, which broader aspects are embodied in the exemplary construction.

Generally speaking, the present invention is directed to an electrode assembly for use in an ultracapacitor. The electrode assembly includes a first electrode that contains a first carbonaceous coating (e.g., activated carbon particles) electrically coupled to a first current collector, and a second electrode that contains a second carbonaceous coating (e.g., activated carbon particles) electrically coupled to a second current collector. A separator is also positioned between the first electrode and the second electrode. The electrode assembly is formed by combining the electrodes and separator together, such as by stacking, spirally winding, etc.

Regardless of the technique employed, at least one of the current collectors (first and/or second current collectors) projects beyond a longitudinal edge of the electrode assembly. The projecting portion of a current collector can provide an increased surface area for contacting a terminal within the housing, which can reduce ESR. For example, the resulting ultracapacitor may exhibit an ESR of about 100 mohms or less, in some embodiments less than about 80 mohms, in some embodiments from about 0.01 to about 50 mohms, and in some embodiments, from about 0.05 to about 20 mohms, as determined at a frequency of 100 kHz and temperature of 25° C. and without an applied voltage. The ESR can also remain stable at a variety of different temperatures. For example, the ultracapacitor may be placed into contact with an atmosphere having a temperature of from about 80° C. or more, in some embodiments from about 100° C. to about 150° C., and in some embodiments, from about 105° C. to about 130° C. (e.g., 85° C. or 105° C.). Even at such high temperatures, the ESR can generally remain within the ranges noted above for a substantial period of time, such as for about 100 hours or more, in some embodiments from about 300 hours to about 5000 hours, and in some embodiments, from about 600 hours to about 4500 hours (e.g., 168, 336, 504, 672, 840, 1008, 1512, 2040, 3024, or 4032 hours). In one embodiment, for example, the ratio of the ESR of the ultracapacitor after being exposed to the hot atmosphere (e.g., 85° C. or 105° C.) for 1008 hours to the ESR of the ultracapacitor when initially exposed to the hot atmosphere is about 1.3 or less, in some embodiments about 1.2 or less, and in some embodiments, from about 0.2 to about 1.

Such low ESR values can also be maintained under various extreme conditions, such as when applied with a high voltage and/or in a humid atmosphere as described above. For example, the ratio of the ESR of the ultracapacitor after being exposed to the hot atmosphere (e.g., 85° C. or 105° C.) and an applied voltage to the initial ESR of the ultracapacitor when exposed to the hot atmosphere but prior to being applied with the voltage may be about 1.8 or less, in some embodiments about 1.7 or less, and in some embodiments, from about 0.2 to about 1.6. The voltage may, for instance, be about 1 volt or more, in some embodiments about 1.5 volts or more, and in some embodiments, from about 2 to about 10 volts (e.g., 2.1 volts). In one embodiment, for example, the ratio noted above may be maintained for 1008 hours or more. The ultracapacitor may also maintain the ESR values noted above when exposed to high humidity levels. For example, the ratio of the ESR of the ultracapacitor after being exposed to the hot atmosphere (e.g., 85° C. or 105° C.) and high humidity (e.g., 85%) to the initial capacitance value of the ultracapacitor when exposed to the hot atmosphere but prior to being exposed to the high humidity may be about 1.5 or less, in some embodiments about 1.4 or less, and in some embodiments, from about 0.2 to about 1.2. In one embodiment, for example, this ratio may be maintained for 1008 hours or more.

The "offset ratio" of a projecting current collector, which is determined by dividing the length of a projecting portion of the current collector by the length of the electrode assembly, is generally controlled to be within a range of from about 0.02 to about 0.3, in some embodiments from about 0.04 to about 0.2, and in some embodiments, from about 0.05 to about 0.1. For example, the length of the projecting portion of a current collector may be from about 1 to about 20 millimeters, in some embodiments from about 2 to about 16 millimeters, and in some embodiments, from about 5 to about 15 millimeters. Likewise, the length of the electrode assembly may be from about 5 to about 100 millimeters, in some embodiments from about 8 to about 60 millimeters, and in some embodiments, from about 10 to about 25 millimeters. By selectively controlling the electrode offset ratio and relative lengths of the projection portion and electrode assembly, the present inventors have discovered that the resulting ultracapacitor may not only achieve a reduced ESR, but also a high capacitance value. The ultracapacitor may, for example, exhibit a capacitance value of about 6 Farads per square centimeter ("F/cm$^2$") or more, in some embodiments about 8 F/cm$^2$ or more, in some embodiments from about 9 to about 100 F/cm$^2$, and in some embodiments, from about 10 to about 80 F/cm$^2$, measured at a frequency of 120 Hz and temperature of 25° C. and without an applied voltage.

The capacitance can also remain stable at high temperatures as noted above for a substantial period of time, such as for about 100 hours or more, in some embodiments from about 300 hours to about 5000 hours, and in some embodiments, from about 600 hours to about 4500 hours (e.g., 168, 336, 504, 672, 840, 1008, 1512, 2040, 3024, or 4032 hours). In one embodiment, for example, the ratio of the capacitance value of the ultracapacitor after being exposed to the hot atmosphere (e.g., 85° C. or 105° C.) for 1008 hours to the capacitance value of the ultracapacitor when initially exposed to the hot atmosphere is about 0.75 or more, in some embodiments from about 0.8 to 1.0, and in some embodiments, from about 0.85 to 1.0. The high capacitance values can also be maintained when applied with a voltage and/or in a humid atmosphere. For example, the ratio of the capacitance value of the ultracapacitor after being exposed to the hot atmosphere (e.g., 85° C. or 105° C.) and an applied voltage to the initial capacitance value of the ultracapacitor when exposed to the hot atmosphere but prior to being applied with the voltage may be about 0.60 or more, in some embodiments from about 0.65 to 1.0, and in some embodiments, from about 0.7 to 1.0. The voltage may, for instance, be about 1 volt or more, in some embodiments about 1.5 volts or more, and in some embodiments, from about 2 to about 10 volts (e.g., 2.1 volts). In one embodiment, for example, the ratio noted above may be maintained for 1008 hours or more. The ultracapacitor may also maintain the capacitance values noted above when exposed to high humidity levels, such as when placed into contact with an atmosphere having a relative humidity of about 40% or more, in some embodiments about 45% or more, in some embodiments about 50% or more, and in some embodiments, about 70% or more (e.g., about 85% to 100%). Relative humidity may, for instance, be determined in accordance with ASTM E337-02, Method A (2007). For example, the ratio of the capacitance value of the ultracapacitor after being exposed to the hot atmosphere (e.g., 85° C. or 105° C.) and high humidity (e.g., 85%) to the initial capacitance value of the ultracapacitor when exposed to the hot atmosphere but prior to being exposed to the high humidity may be about 0.7 or more, in some embodiments from about 0.75 to 1.0, and in some embodiments, from about 0.80 to 1.0. In one embodiment, for example, this ratio may be maintained for 1008 hours or more.

Various embodiments of the present invention will now be described in more detail.

I. Electrode Assembly

A. Electrodes

As indicated above, the electrode assembly contains first and second electrodes, which in turn contain first and second current collectors, respectively. It should be understood that additional current collectors may also be employed if desired, particularly if the ultracapacitor includes multiple energy storage cells. The current collectors may be formed from the same or different materials. Regardless, each collector is typically formed from a substrate that includes a conductive metal, such as aluminum, stainless steel, nickel, silver, palladium, etc., as well as alloys thereof. Aluminum and aluminum alloys are particularly suitable for use in the present invention. The substrate may be in the form of a foil, sheet, plate, mesh, etc. The substrate may also have a relatively small thickness, such as about 200 micrometers or less, in some embodiments from about 1 to about 100 micrometers, in some embodiments from about 5 to about 80 micrometers, and in some embodiments, from about 10 to about 50 micrometers. Although by no means required, the surface of the substrate may be optionally roughened, such as by washing, etching, blasting, etc.

First and second carbonaceous coatings are also electrically coupled to the first and second current collectors, respectively. While they may be formed from the same or different types of materials and may contain one or multiple layers, each of the carbonaceous coatings generally contains at least one layer that includes activated particles. In certain embodiments, for instance, the activated carbon layer may be directly positioned over the current collector and may optionally be the only layer of the carbonaceous coating. Examples of suitable activated carbon particles may include, for instance, coconut shell-based activated carbon, petroleum coke-based activated carbon, pitch-based activated carbon, polyvinylidene chloride-based activated carbon, phenolic resin-based activated carbon, polyacrylonitrile-based activated carbon, and activated carbon from natural sources such as coal, charcoal or other natural organic sources.

In certain embodiments, it may be desired to selectively control certain aspects of the activated carbon particles, such as their particle size distribution, surface area, and pore size distribution to help improve ion mobility for certain types of electrolytes after being subjected to one or more charge-discharge cycles. For example, at least 50% by volume of the particles (D50 size) may have a size in the range of from about 0.01 to about 30 micrometers, in some embodiments from about 0.1 to about 20 micrometers, and in some embodiments, from about 0.5 to about 10 micrometers. At least 90% by volume of the particles (D90 size) may likewise have a size in the range of from about 2 to about 40 micrometers, in some embodiments from about 5 to about 30 micrometers, and in some embodiments, from about 6 to about 15 micrometers. The BET surface may also range from about 900 m$^2$/g to about 3,000 m$^2$/g, in some embodiments from about 1,000 m$^2$/g to about 2,500 m$^2$/g, and in some embodiments, from about 1,100 m$^2$/g to about 1,800 m$^2$/g.

In addition to having a certain size and surface area, the activated carbon particles may also contain pores having a certain size distribution. For example, the amount of pores less than about 2 nanometers in size (i.e., "micropores") may provide a pore volume of about 50 vol. % or less, in some embodiments about 30 vol. % or less, and in some embodiments, from 0.1 vol. % to 15 vol. % of the total pore volume. The amount of pores between about 2 nanometers and about 50 nanometers in size (i.e., "mesopores") may likewise be from about 20 vol. % to about 80 vol. %, in some embodiments from about 25 vol. % to about 75 vol. %, and in some embodiments, from about 35 vol. % to about 65 vol. %. Finally, the amount of pores greater than about 50 nanometers in size (i.e., "macropores") may be from about 1 vol. % to about 50 vol. %, in some embodiments from about 5 vol. % to about 40 vol. %, and in some embodiments, from about 10 vol. % to about 35 vol. %. The total pore volume of the carbon particles may be in the range of from about 0.2 cm$^3$/g to about 1.5 cm$^3$/g, and in some embodiments, from about 0.4 cm$^3$/g to about 1.0 cm$^3$/g, and the median pore width may be about 8 nanometers or less, in some embodiments from about 1 to about 5 nanometers, and in some embodiments, from about 2 to about 4 nanometers. The pore sizes and total pore volume may be measured using nitrogen adsorption and analyzed by the Barrett-Joyner-Halenda ("BJH") technique as is well known in the art.

If desired, binders may be present in an amount of about 60 parts or less, in some embodiments 40 parts or less, and in some embodiments, from about 1 to about 25 parts per 100 parts of carbon in the first and/or second carbonaceous coatings. Binders may, for example, constitute about 15 wt. % or less, in some embodiments about 10 wt. % or less, and in some embodiments from about 0.5 wt. % to about 5 wt. % of the total weight of a carbonaceous coating. Any of a variety of suitable binders can be used in the electrodes. For instance, water-insoluble organic binders may be employed in certain embodiments, such as styrene-butadiene copolymers, polyvinyl acetate homopolymers, vinyl-acetate ethylene copolymers, vinyl-acetate acrylic copolymers, ethylene-vinyl chloride copolymers, ethylene-vinyl chloride-vinyl acetate terpolymers, acrylic polyvinyl chloride polymers, acrylic polymers, nitrile polymers, fluoropolymers such as polytetrafluoroethylene or polyvinylidene fluoride, polyolefins, etc., as well as mixtures thereof. Water-soluble organic binders may also be employed, such as polysaccharides and derivatives thereof. In one particular embodiment, the polysaccharide may be a nonionic cellulosic ether, such as alkyl cellulose ethers (e.g., methyl cellulose and ethyl cellulose); hydroxyalkyl cellulose ethers (e.g., hydroxyethyl cellulose, hydroxypropyl cellulose, hydroxypropyl hydroxybutyl cellulose, hydroxyethyl hydroxypropyl cellulose, hydroxyethyl hydroxybutyl cellulose, hydroxyethyl hydroxypropyl hydroxybutyl cellulose, etc.); alkyl hydroxyalkyl cellulose ethers (e.g., methyl hydroxyethyl cellulose, methyl hydroxypropyl cellulose, ethyl hydroxyethyl cellulose, ethyl hydroxypropyl cellulose, methyl ethyl hydroxyethyl cellulose and methyl ethyl hydroxypropyl cellulose); carboxyalkyl cellulose ethers (e.g., carboxymethyl cellulose); and so forth, as well as protonated salts of any of the foregoing, such as sodium carboxymethyl cellulose.

Other materials may also be employed within an activated carbon layer of the first and/or second carbonaceous coatings and/or within other layers of the first and/or second carbonaceous coatings. For example, in certain embodiments, a conductivity promoter may be employed to further increase electrical conductivity. Exemplary conductivity promoters may include, for instance, carbon black, graphite (natural or artificial), graphite, carbon nanotubes, nanowires or nanotubes, metal fibers, graphenes, etc., as well as mixtures thereof. Carbon black is particularly suitable. When employed, conductivity promoters typically constitute about 60 parts or less, in some embodiments 40 parts or less, and in some embodiments, from about 1 to about 25 parts per 100 parts of the activated carbon particles in a carbonaceous coating. Conductivity promotes may, for example, constitute about 15 wt. % or less, in some embodiments about 10 wt. % or less, and in some embodiments, from about 0.5 wt. % to about 5 wt. % of the total weight of a carbonaceous coating. Activated carbon particles likewise typically constitute 85 wt. % or more, in some embodiments about 90 wt. % or more, and in some embodiments, from about 95 wt. % to about 99.5 wt. % of a carbonaceous coating.

The particular manner in which a carbonaceous coating is applied to a current collector may vary as is well known to those skilled in the art, such as printing (e.g., rotogravure), spraying, slot-die coating, drop-coating, dip-coating, etc. Regardless of the manner in which it is applied, the resulting electrode is typically dried to remove moisture from the coating, such as at a temperature of about 100° C. or more, in some embodiments about 200° C. or more, and in some embodiments, from about 300° C. to about 500° C. The electrode may also be compressed (e.g., calendered) to optimize the volumetric efficiency of the ultracapacitor. After any optional compression, the thickness of each carbonaceous coating may generally vary based on the desired electrical performance and operating range of the ultracapacitor. Typically, however, the thickness of a coating is from about 20 to about 200 micrometers, 30 to about 150 micrometers, and in some embodiments, from about 40 to about 100 micrometers. Coatings may be present on one or both sides of a current collector. Regardless, the thickness of the overall electrode (including the current collector and the carbonaceous coating(s) after optional compression) is typically within a range of from about 20 to about 350 micrometers, in some embodiments from about 30 to about 300 micrometers, and in some embodiments, from about 50 to about 250 micrometers.

B. Separator

A separator is also positioned between the first and second electrodes. If desired, other separators may also be employed in the electrode assembly. For example, one or more separators may be positioned over the first electrode, the second electrode, or both. The separators enable electrical isolation of one electrode from another to help prevent an electrical short, but still allow transport of ions between the two electrodes. In certain embodiments, for example, a separator may be employed that includes a cellulosic fibrous material (e.g., airlaid paper web, wet-laid paper web, etc.), nonwoven fibrous material (e.g., polyolefin nonwoven webs), woven fabrics, film (e.g., polyolefin film), etc. Cellulosic fibrous materials are particularly suitable for use in the ultracapacitor, such as those containing natural fibers, synthetic fibers, etc. Specific examples of suitable cellulosic fibers for use in the separator may include, for instance, hardwood pulp fibers, softwood pulp fibers, rayon fibers, regenerated cellulosic fibers, etc. Regardless of the particular materials employed, the separator typically has a thickness of from about 5 to about 150 micrometers, in some embodiments from about 10 to about 100 micrometers, and in some embodiments, from about 20 to about 80 micrometers.

Figure 1:
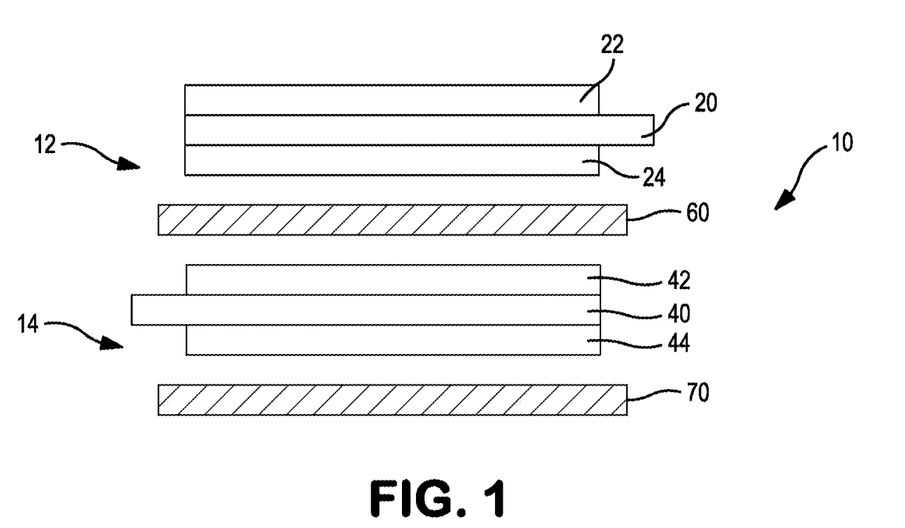
FIG. 1 is a cross-sectional, exploded view of one embodiment of the electrode assembly of the present invention.
Figure 2:
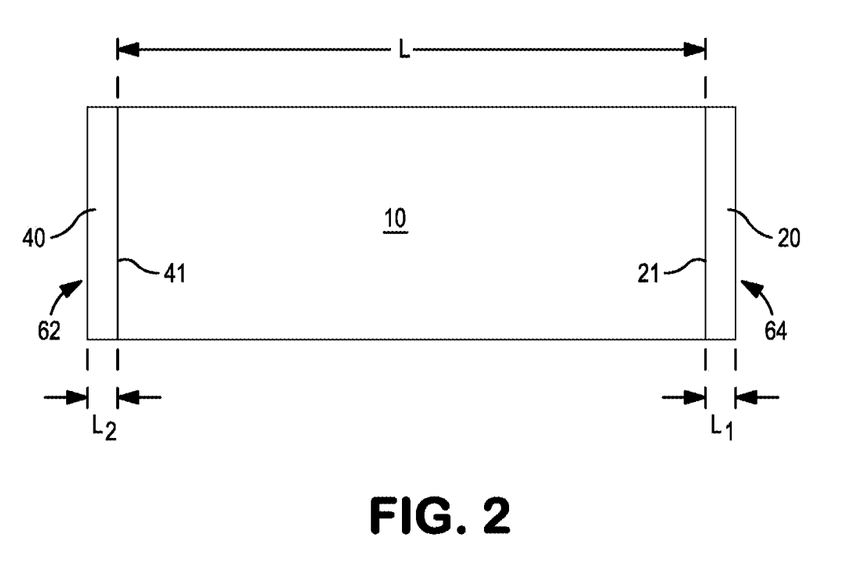
FIG. 2 is a top view of the electrode assembly of FIG. 1.

The manner in which the components of the electrode assembly are combined together may vary as is known in the art. For example, the electrodes and separator may be initially folded, wound, or otherwise contacted together to form an electrode assembly. In one particular embodiment, the electrodes, separator, and optional electrolyte may be wound into an electrode assembly having a "jelly-roll" configuration. Referring to FIGS. 1-2, for instance, one embodiment of an electrode assembly 10 is shown that contains a first electrode 12, second electrode 14, and a separator 60 positioned between the electrodes 12 and 14. In this particular embodiment, the electrode assembly 10 also includes another separator 70 that is positioned over the second electrode 14. In this manner, each of two coated surfaces of the electrodes is separated by a separator, thereby maximizing surface area per unit volume and capacitance. The first electrode 12 contains carbonaceous coatings 22 and 24 disposed on opposing surfaces of a first current collector 20, while the second electrode 14 contains carbonaceous coatings 42 and 44 disposed on opposing surfaces of a second current collector 40. Of course, it should be understood that both surfaces of a current collector need not contain a carbonaceous coating.

As depicted in FIG. 2, the electrodes 12 and 14 and separators 60 and 70 are wound together so that the assembly 10 extends in a longitudinal direction between longitudinal edges 41 and 21 to define a length "L." In the illustrated embodiment, for instance, the separators 60 and 70 are shown as having lengths that are similar in value and larger than the corresponding length of the carbonaceous coatings. Therefore, the length "L" of the assembly 10 in this embodiment is effectively the distance between the outermost edges of the separators. For example the length "L" may be from about 5 to about 100 millimeters, in some embodiments from about 8 to about 60 millimeters, and in some embodiments, from about 10 to about 25 millimeters. The first current collector 20 is positioned such that it has a first projecting portion 64 that projects beyond the longitudinal edge 21 of the assembly 10. Similarly, the second current collector 40 is positioned such that it has a second projecting portion 62 that projects beyond the longitudinal edge 41 of the assembly 10. For example, the length "$L_1$" of the first projecting portion 64, the length "$L_2$" of the second projecting portion 62, or both may be from about 1 to about 20 millimeters, in some embodiments from about 2 to about 16 millimeters, and in some embodiments, from about 5 to about 15 millimeters. In the illustrated embodiment, the projection of the current collectors is accomplished by using current collectors that have a length greater than the corresponding carbonaceous coatings. Alternatively, however, the projection of the current collectors could also be achieved by simply offsetting them relative to other components of the assembly.

II. Nonaqueous Electrolyte

To form an ultracapacitor, an electrolyte is placed into ionic contact with the first electrode and the second electrode before, during, and/or after the electrodes and separator are combined together to form the electrode assembly. The electrolyte is generally nonaqueous in nature and thus contains at least one nonaqueous solvent. To help extend the operating temperature range of the ultracapacitor, it is typically desired that the nonaqueous solvent have a relatively high boiling temperature, such as about 150° C. or more, in some embodiments about 200° C. or more, and in some embodiments, from about 220° C. to about 300° C. Particularly suitable high boiling point solvents may include, for instance, cyclic carbonate solvents, such as ethylene carbonate, propylene carbonate, butylene carbonate, vinylene carbonate, etc. Of course, other nonaqueous solvents may also be employed, either alone or in combination with a cyclic carbonate solvent. Examples of such solvents may include, for instance, open-chain carbonates (e.g., dimethyl carbonate, ethyl methyl carbonate, diethyl carbonate, etc.), aliphatic monocarboxylates (e.g., methyl acetate, methyl propionate, etc.), lactone solvents (e.g., butyrolactone valerolactone, etc.), nitriles (e.g., acetonitrile, glutaronitrile, adiponitrile, methoxyacetonitrile, 3-methoxypropionitrile, etc.), amides (e.g., N,N-dimethylformamide, N,N-diethylacetamide, N-methylpyrrolidinone), alkanes (e.g., nitromethane, nitroethane, etc.), sulfur compounds (e.g., sulfolane, dimethyl sulfoxide, etc.); and so forth.

The electrolyte may also contain at least one ionic liquid, which is dissolved in the nonaqueous solvent. While the concentration of the ionic liquid can vary, it is typically desired that the ionic liquid is present at a relatively high concentration. For example, the ionic liquid may be present in an amount of about 0.8 moles per liter (M) of the electrolyte or more, in some embodiments about 1.0 M or more, in some embodiments about 1.2 M or more, and in some embodiments, from about 1.3 to about 1.8 M.

The ionic liquid is generally a salt having a relatively low melting temperature, such as about 400° C. or less, in some embodiments about 350° C. or less, in some embodiments from about 1° C. to about 100° C., and in some embodiments, from about 5° C. to about 50° C. The salt contains a cationic species and counterion. The cationic species contains a compound having at least one heteroatom (e.g., nitrogen or phosphorous) as a "cationic center." Examples of such heteroatomic compounds include, for instance, unsubstituted or substituted organoquaternary ammonium compounds, such as ammonium (e.g., trimethylammonium, tetraethylammonium, etc.), pyridinium, pyridazinium, pyramidinium, pyrazinium, imidazolium, pyrazolium, oxazolium, triazolium, thiazolium, quinolinium, piperidinium, pyrrolidinium, quaternary ammonium spiro compounds in which two or more rings are connected together by a spiro atom (e.g., carbon, heteroatom, etc.), quaternary ammonium fused ring structures (e.g., quinolinium, isoquinolinium, etc.), and so forth. In one particular embodiment, for example, the cationic species may be an N-spirobicyclic compound, such as symmetrical or asymmetrical N-spirobicyclic compounds having cyclic rings. One example of such a compound has the following structure:

wherein m and n are independently a number from 3 to 7, and in some embodiments, from 4 to 5 (e.g., pyrrolidinium or piperidinium).

Suitable counterions for the cationic species may likewise include halogens (e.g., chloride, bromide, iodide, etc.); sulfates or sulfonates (e.g., methyl sulfate, ethyl sulfate, butyl sulfate, hexyl sulfate, octyl sulfate, hydrogen sulfate, methane sulfonate, dodecylbenzene sulfonate, dodecylsulfate, trifluoromethane sulfonate, heptadecafluorooctanesulfonate, sodium dodecylethoxysulfate, etc.); sulfosuccinates; amides (e.g., dicyanamide); imides (e.g., bis (pentafluoroethyl-sulfonyl)imide, bis (trifluoromethylsulfonyl)imide, bis(trifluoromethyl)imide, etc.); borates (e.g., tetrafluoroborate, tetracyanoborate, bis [oxalato]borate, bis[salicylato]borate, etc.); phosphates or phosphinates (e.g., hexafluorophosphate, diethylphosphate, bis(pentafluoroethyl)phosphinate, tris(pentafluoroethyl)-trifluorophosphate, tris(nonafluorobutyl)trifluorophosphate, etc.); antimonates (e.g., hexafluoroantimonate); aluminates (e.g., tetrachloroaluminate); fatty acid carboxylates (e.g., oleate, isostearate, pentadecafluorooctanoate, etc.); cyanates; acetates; and so forth, as well as combinations of any of the foregoing.

Several examples of suitable ionic liquids may include, for instance, spiro-(1,1')-bipyrrolidinium tetrafluoroborate, triethylmethyl ammonium tetrafluoroborate, tetraethyl ammonium tetrafluoroborate, spiro-(1,1')-bipyrrolidinium iodide, triethylmethyl ammonium iodide, tetraethyl ammonium iodide, methyltriethylammonium tetrafluoroborate, tetrabutylammonium tetrafluoroborate, tetraethylammonium hexafluorophosphate, etc.

III. Housing

The ultracapacitor may also contain a housing within which the electrode assembly and electrolyte are retained and optionally hermetically sealed. The nature of the housing may vary as desired. In one embodiment, for example, the housing may contain a metal container ("can"), such as those formed from tantalum, niobium, aluminum, nickel, hafnium, titanium, copper, silver, steel (e.g., stainless), alloys thereof, composites thereof (e.g., metal coated with electrically conductive oxide), and so forth. Aluminum is particularly suitable for use in the present invention. The metal container may have any of a variety of different shapes, such as cylindrical, D-shaped, etc. Cylindrically-shaped containers are particular suitable.

Figure 3:
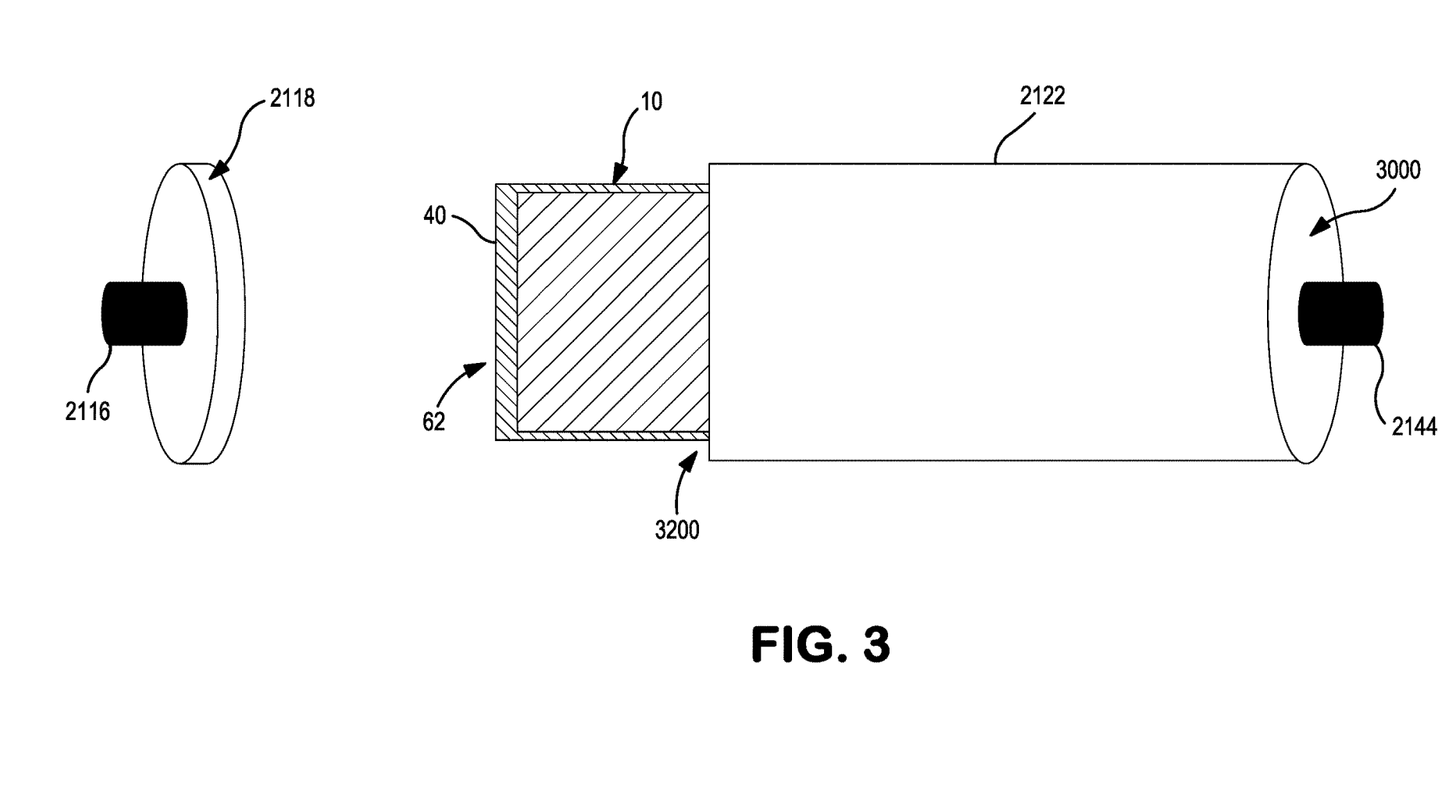
FIG. 3 is a schematic view of one embodiment of the ultracapacitor that may be formed in accordance with the present invention prior to sealing with a lid.
Figure 4:
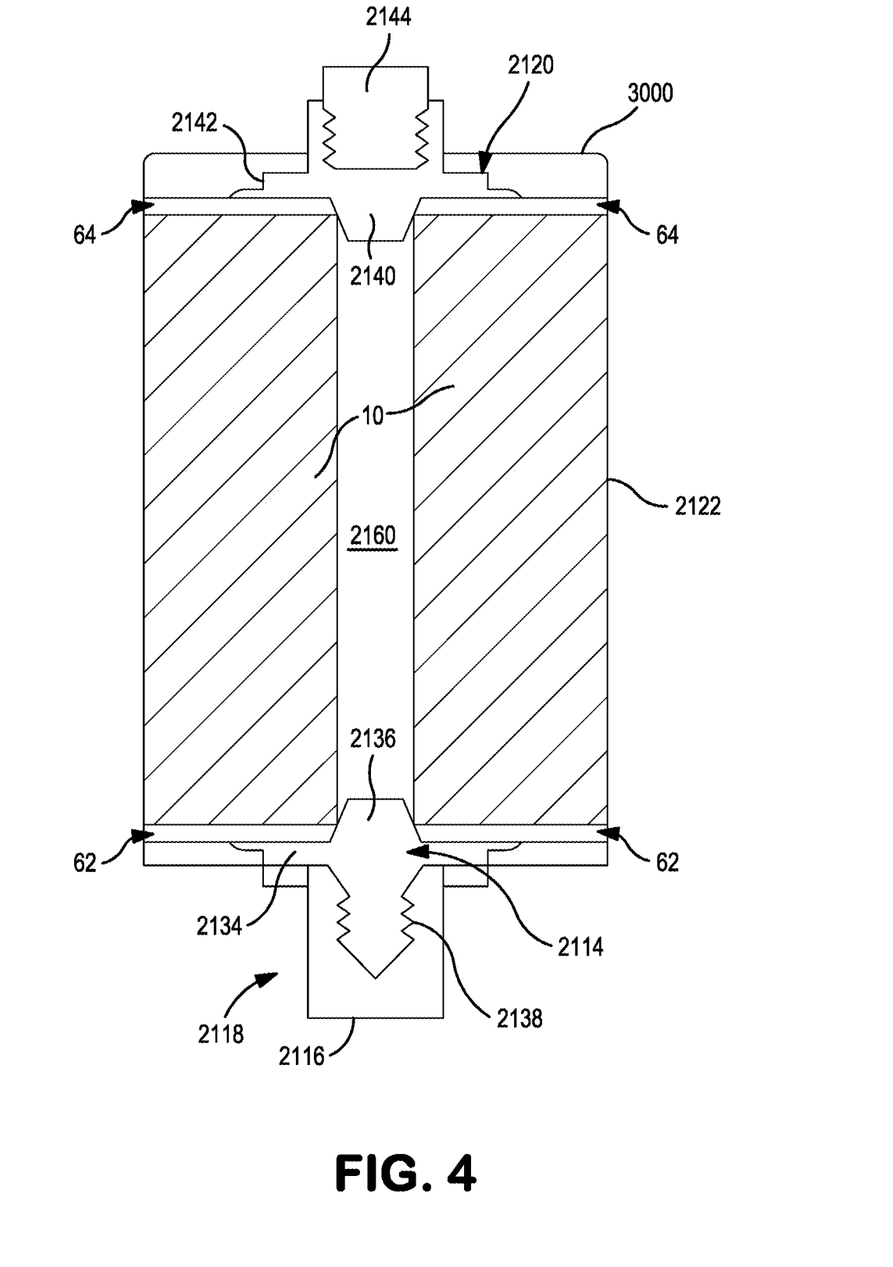
FIG. 4 is a schematic view of one embodiment of ultracapacitor that may be formed in accordance with the present invention.

Referring to FIGS. 3-4, one embodiment of a housing that may be employed in the ultracapacitor is shown in more detail. In this particular embodiment, the housing contains a metal container 2122 (e.g., cylindrically-shaped can) that defines a base 3000 and an open end 3200. A lid 2118 is disposed over the open end 3200 and attached (e.g. welded) to the container 2122 to seal the housing. In one particular embodiment, as shown in FIG. 4, the lid 2118 may contain a first collector disc 2114, which includes a disc-shaped portion 2134, a stud portion 2136, and a fastener 2138 (e.g., screw). The collector disc 2114 is aligned with a first end of a hollow core 2160, which is formed in the center of the electrode assembly 10, and the stud portion 2136 is then inserted into an opening of the core so that the first collector disc 2114 (e.g., disc-shaped portion 2134 and/or stud portion 2136) contacts the second projecting portion 62 of the second current collector 40. In this manner, the second current collector 40 is placed into electrical contact with the lid 2118. The fastener 2138 may also be coupled (e.g., threadably connected) to a first terminal 2116. The metal container 2122 may likewise contain a second collector disc 2120, which includes a disc-shaped portion 2142, a stud portion 2140, and a second terminal 2144. The second collector disc 2120 is aligned with the second end of the hollow core 2160, and the stud portion 2140 is then inserted into the opening of the core so that the second collector disc 2120 (e.g., disc-shaped portion 2142 and/or stud portion 2140) contacts the first projecting portion 64 of the first current collector 20. In this manner, the first current collector 20 is placed into electrical contact with the base 3000. Although not specifically shown in FIGS. 3-4, the length of the projecting portions 62 and/or 64 may become folded or otherwise deformed when contacting the collectors discs.

Test Methods

Equivalent Series Resistance (ESR)

Equivalence series resistance may be measured using a Keithley 3330 Precision LCZ meter with a DC bias of 0.0 volts, 1.1 volts, or 2.1 volts (0.5 volt peak to peak sinusoidal signal). The operating frequency is 100 kHz. A variety of temperature and relative humidity levels may be tested. For example, the temperature may be 25° C., 85° C., or 105° C., and the relative humidity may be 25% or 85%.

Capacitance

The capacitance may be measured using a Keithley 3330 Precision LCZ meter with a DC bias of 0.0 volts, 1.1 volts, or 2.1 volts (0.5 volt peak to peak sinusoidal signal). The operating frequency is 120 Hz. A variety of temperature and relative humidity levels may be tested. For example, the temperature may be 25° C., 85° C., or 105° C., and the relative humidity may be 25% or 85%.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. An electrode assembly for an ultracapacitor that defines a length between opposing first and second longitudinal edges, wherein the electrode assembly comprises:
   a first electrode comprising a first current collector electrically coupled to a first carbonaceous coating, wherein at least a portion of the first current collector projects beyond the first longitudinal edge to define a first projecting portion, wherein the offset ratio of the first projecting portion is from 0.05 to about 0.3;
   a second electrode comprising a second current collector electrically coupled to a second carbonaceous coating, wherein at least a portion of the second current collector projects beyond the second longitudinal edge to define a second projecting portion, wherein the offset ratio of the second projecting portion is from 0.05 to about 0.3; and
   a separator positioned between the first electrode and the second electrode.

2. The electrode assembly of claim 1, wherein the length of the first projecting portion, the second projecting portion, or both is from about 1 to about 20 millimeters.

3. The electrode assembly of claim 1, wherein the length of the electrode assembly is from about 5 to about 100 millimeters.

4. The electrode assembly of claim 1, wherein the electrode assembly has a jellyroll configuration.

5. The electrode assembly of claim 1, wherein the first current collector and the second current collector each contain a substrate that includes a conductive metal.

6. The electrode assembly of claim 5, wherein the conductive metal is aluminum or an alloy thereof.

7. The electrode assembly of claim 1, wherein the first carbonaceous coating, the second carbonaceous coating, or both contain activated carbon particles.

8. The electrode assembly of claim 1, wherein the separator includes a cellulosic fibrous material.

9. An ultracapacitor that comprises the electrode assembly of claim 1 and a nonaqueous electrolyte that is in ionic contact with the first electrode and the second electrode.

10. The ultracapacitor of claim 9, wherein the nonaqueous electrolyte contains an ionic liquid that is dissolved in a nonaqueous solvent, wherein the ionic liquid contains a cationic species and a counterion.

11. The ultracapacitor of claim 10, wherein the nonaqueous solvent includes propylene carbonate, a nitrile, or a combination thereof.

12. The ultracapacitor of claim 10, wherein the cationic species includes an organoquaternary ammonium compound.

13. The ultracapacitor of claim 12, wherein the organoquaternary ammonium compound has the following structure:

wherein m and n are independently a number from 3 to 7.

14. The ultracapacitor of claim 10, wherein the ionic liquid is present at a concentration of about 1.0 M or more.

15. The ultracapacitor of claim 9, wherein the ultracapacitor exhibits an ESR of about 100 mohms or less as determined at a frequency of 100 kHz and temperature of 25° C.

16. The ultracapacitor of claim 9, wherein the ultracapacitor exhibits a capacitance value of about 6 Farads per square centimeter or more as determined at a frequency of 120 Hz and temperature of 25° C.

17. The ultracapacitor of claim 9, wherein the ultracapacitor contains a housing that includes a container having a base and an open end, wherein a lid is disposed adjacent to the open end, and further wherein the electrode assembly is positioned within the housing so that the first projecting portion is placed into electrical contact with the base or the lid.

18. The ultracapacitor of claim 17, wherein the container is formed from a metal.

19. The ultracapacitor of claim 17, wherein the container has a cylindrical shape.

20. The ultracapacitor of claim 1, wherein the offset ratio of the first projecting portion is from 0.05 to about 0.2.

21. The ultracapacitor of claim 1, wherein the first projecting portion is in electrical contact with the base and the second projection portion is in electrical contact with the lid.

* * * * *